United States Patent
Li et al.

(10) Patent No.: US 10,937,189 B2
(45) Date of Patent: Mar. 2, 2021

(54) POSE ESTIMATION METHOD, METHOD OF DISPLAYING VIRTUAL OBJECT USING ESTIMATED POSE, AND APPARATUSES PERFORMING THE SAME

(71) Applicant: Samsung Electronics Co., Ltd., Suwon-si (KR)

(72) Inventors: Weiming Li, Beijing (CN); Zairan Wang, Beijing (CN); Dongdong Yu, Beijing (CN); Hao Wang, Beijing (CN); Minsu Ahn, Yongin-si (KR); Qiang Wang, Beijing (CN); Sunghoon Hong, Suwon-si (KR); Yang Liu, Beijing (CN); Yueying Kao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 16/238,785

(22) Filed: Jan. 3, 2019

(65) Prior Publication Data
US 2019/0220993 A1 Jul. 18, 2019

(30) Foreign Application Priority Data

Jan. 18, 2018 (CN) .......................... 201810048656.9
Jul. 24, 2018 (KR) ........................ 10-2018-0085786

(51) Int. Cl.
*G06T 7/73* (2017.01)

(52) U.S. Cl.
CPC ...... *G06T 7/73* (2017.01); *G06T 2207/20016* (2013.01); *G06T 2207/20081* (2013.01); *G06T 2207/20084* (2013.01)

(58) Field of Classification Search
CPC .......... G06N 3/0454; G06N 3/08; G06T 7/73; G06T 2207/20084
See application file for complete search history.

(56) References Cited

U.S. PATENT DOCUMENTS

| 2017/0070724 | A9  | 3/2017 | Engedal |                |
|--------------|-----|--------|---------|----------------|
| 2019/0012548 | A1* | 1/2019 | Levi    | ... G06K 9/00805 |
| 2019/0026917 | A1* | 1/2019 | Liao    | ..... G06K 9/4628 |

FOREIGN PATENT DOCUMENTS

| KR | 10-1043458 B1    | 6/2011 |
| KR | 10-2016-0090088 A | 7/2016 |
| KR | 10-1648270 B1    | 8/2016 |

OTHER PUBLICATIONS

Zhang, Ning, et al. "Fine-Grained Pose Prediction, Normalization, and Recognition.", *Cornell University, arXiv preprint arXiv:1511. 07063*, Nov. 22, 2015 (10 pages in English).
Yan, Yan, et al. "A Multi-Task Learning Framework for Head Pose Estimation under Target Motion", *IEEE Transactions on Pattern Analysis and Machine Intelligence*, vol. 38, Issue 6, Jun. 2016 (5 pages in English).

* cited by examiner

*Primary Examiner* — Ross Varndell
(74) *Attorney, Agent, or Firm* — NSIP Law

(57) ABSTRACT

Disclosed are a pose estimation methods and apparatuses of displaying a virtual object using an estimated pose. The pose estimation method includes receiving an input image and estimating pose information of an object from the input image based on local information of the object.

14 Claims, 19 Drawing Sheets

Local information of object

Input image

Pose of object

300

POSE ESTIMATION METHOD, METHOD OF DISPLAYING VIRTUAL OBJECT USING ESTIMATED POSE, AND APPARATUSES PERFORMING THE SAME

CROSS-REFERENCE TO RELATED APPLICATIONS

This application claims the benefit under 35 USC § 119(a) of Chinese Patent Application No. 201810048656.9 filed on Jan. 18, 2018 in the State Intellectual Property Office of the P.R.C. and Korean Patent Application No. 10-2018-0085786 filed on Jul. 24, 2018 in the Korean Intellectual Property Office, the entire disclosures of which are incorporated herein by reference for all purposes.

BACKGROUND

1. Field

The following description relates to estimating a pose of an object and displaying a virtual object.

2. Description of Related Art

A method of estimating a two-dimensional (2D) or three-dimensional (3D) pose of an object may be widely used in vision applications such as, for example, augmented reality (AR), closed circuit televisions (CCTV), navigation systems, steering or controlling devices, and robot applications.

In recent years, the interest in AR technology has increased. A basic function of the AR technology is a 3D interaction, which involves overlapping a 3D object of a real world and augmented information or enhanced information, and displaying a result of the overlapping.

To generate a realistic visual effect from such a 3D interaction, augmented information and a 3D pose of an actual object is matched, and thus, 2D or 3D pose information of the actual object is needed.

Existing 3D interaction technology may estimate a pose of an object using a signal image to obtain pose information of the object. However, the existing technology that estimates a pose directly from a single image may only use overall or global information of the image. Thus, such a method of estimating a pose based on global information of a single image may not have high accuracy in pose estimation, and thus may not satisfy a demand from AR applications for high accuracy in pose estimation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a pose estimation method including receiving an input image, and estimating pose information of an object from the input image based on local information of the object.

The pose estimation method may include concurrently estimating keypoint information of the object while estimating the pose information of the object, wherein the local information may be based on the keypoint information.

The estimating of the pose information of the object may include correcting the pose information using the keypoint information.

A neural network may perform the pose estimation.

A task of the estimating of the pose information and a task of the estimating of the keypoint information may share parameters of a base layer in the neural network.

The task of the estimating of the pose information and the task of the estimating of the keypoint information may be connected in the neural network through one of a parallel mode and a cascade mode, wherein the keypoint information may be input to the task of estimating the pose information in the cascade mode.

The neural network may include a first path that may include the base layer and one or more convolution layers to estimate the keypoint information, and a second path that may include the base layer and one or more fully-connected layers to estimate the pose information.

The neural network may include a first path that may include the base layer and one or more convolution layers to estimate the keypoint information, and a second path that may include the base layer, one or more convolution layers, and one or more fully-connected layers to estimate the pose information, wherein an output of one of the convolution layers in the first path may be connected to an output of one of the convolution layers in the second path to be input to the fully-connected layers.

The neural network may include a first path comprising the base layer and one or more convolution layers to estimate the keypoint information, and a second path comprising the base layer, the one or more convolution layers in the first path, and one or more fully-connected layers to estimate the pose information, wherein outputs of two or more of the convolution layers in the first path may be connected and input to one of the fully-connected layers in the second path.

The pose estimation method may include concurrently estimating class information of the object from the input image while estimating the pose information and the keypoint information of the object.

A task of estimating the pose information, a task of estimating the keypoint information, and a task of estimating the class information may share parameters of a base layer in a neural network.

The neural network may further include a third path comprising the base layer and one or more connected layers to estimate the class information.

In another general aspect, there is provided an apparatus including a processor configured to receive an input image, and estimate pose information of an object from the input image based on local information of the object.

The processor may be configured to concurrently estimate keypoint information of the object while estimating the pose information of the object, wherein the local information is based on the keypoint information.

The processor may be configured to correct the pose information using the keypoint information.

The processor may be configured to estimate the pose information and the keypoint information of the object through a neural network.

A task of estimating the pose information and a task of estimating the keypoint information may share parameters of a base layer in the neural network.

The neural network may include a first path comprising the base layer and one or more convolution layers to estimate the keypoint information, and a second path comprising the base layer and one or more fully-connected layers to estimate the pose information.

The neural network may include a first path that may include the base layer and one or more convolution layers to estimate the keypoint information, and a second path that may include the base layer, one or more convolution layers, and one or more fully-connected layers to estimate the pose information, wherein an output of one of the convolution layers in the first path may be connected to an output of one of the convolution layers in the second path to be input to the fully-connected layers.

The neural network may include a first path that may include the base layer and one or more convolution layers to estimate the keypoint information, and a second path that may include the base layer, the one or more convolution layers in the first path, and one or more fully-connected layers to estimate the pose information, wherein outputs of two or more of the convolution layers in the first path may be connected and input to one of the fully-connected layers in the second path.

Other features and aspects will be apparent from the following detailed description, the drawings, and the claims.

Figure 1:
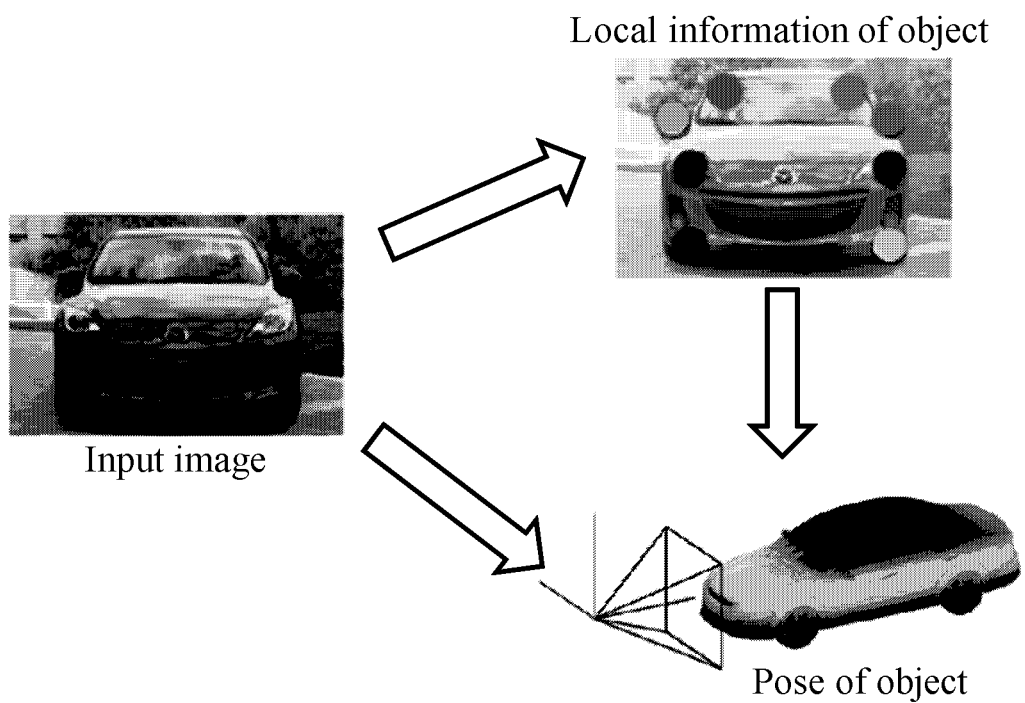
FIG. 1 illustrates an example of a pose estimation method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
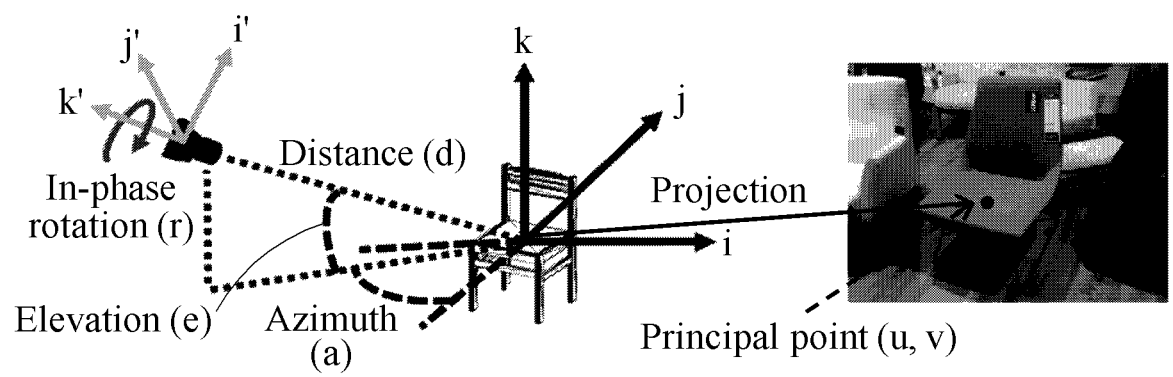
FIG. 2 illustrates an example of pose information of an object.

FIG. 1 illustrates an example of a pose estimation method. FIG. 2 illustrates an example of pose information of an object.

Referring to FIGS. 1 and 2, a pose estimation apparatus may estimate, from an input image, pose information associated with a pose or a posture of an object. For example, the pose estimation apparatus may estimate the pose information of the object from the input image based on local information of the object, keypoint information of the object, and/or class information of the object.

The pose information of the object may include pose information associated with a pose of each of 6 degrees of freedom (DoF). In the example illustrated in FIG. 2, 6 DoF pose information of an object is indicated from a camera model, and indicates a first rectangular coordinate system (i, k, j) at which an actual object is positioned and a second rectangular coordinate system (i', k', j') at which a camera is positioned.

For example, as illustrated, the 6DoF pose information includes an azimuth a, an elevation e, an in-phase rotation r, a distance d, and a principal point (u, v). The principal point (u, v) may include a horizontal coordinate (u) of the principal point (u, v) and a vertical coordinate (v) of the principal point (u, v).

The estimated 6DoF pose information of an object may be applied to display a virtual object in an augmented reality (AR) and also to various other technical fields, such as, for example, closed circuit televisions (CCTV), navigation systems, and robot applications.

The pose information may include at least one of pieces of the 6DoF pose information. However, the pose information may not be limited to the 6DoF pose information, but to other information as well.

The pose estimation apparatus may be embodied or provided in an ECU or the VCU of a vehicle, a personal computer (PC), a data server, or a portable electronic device. The portable electronic device described herein refers to any devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, or other consumer electronics/information technology (CE/IT) device.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a drone, or a robot requiring a positioning operation.

Figure 3:
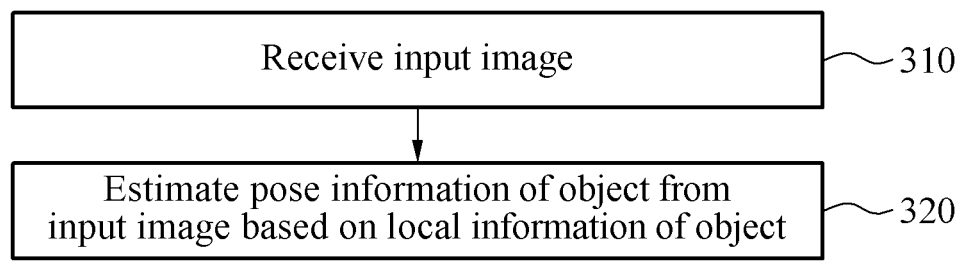
FIG. 3 illustrates an example of a pose estimation method using local information of an object.

FIG. 3 is a diagram illustrating an example of a pose estimation method using local information of an object. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

FIG. 3 illustrates a pose estimation method 300 to be performed by a pose estimation apparatus to estimate a pose of an object using local information of the object. Referring to FIG. 3, in operation 310, the pose estimation apparatus receives or obtains an input image.

In operation 320, the pose estimation apparatus obtains local information of an object from the input image, and estimates pose information of the object from the input image based on the local information.

For example, the pose estimation apparatus may obtain the local information of the object using keypoint information of the object. However, examples are not limited to the example described in the foregoing, and the pose estimation apparatus may obtain the local information of the object through various methods.

The pose estimation apparatus may supervise training parameters using the local information of the object and the pose information of the object together to estimate a pose of the object and may thus improve overall or global information of the object based on the local information of the object. Thus, the pose estimation apparatus improves accuracy in pose estimation.

Figure 4:
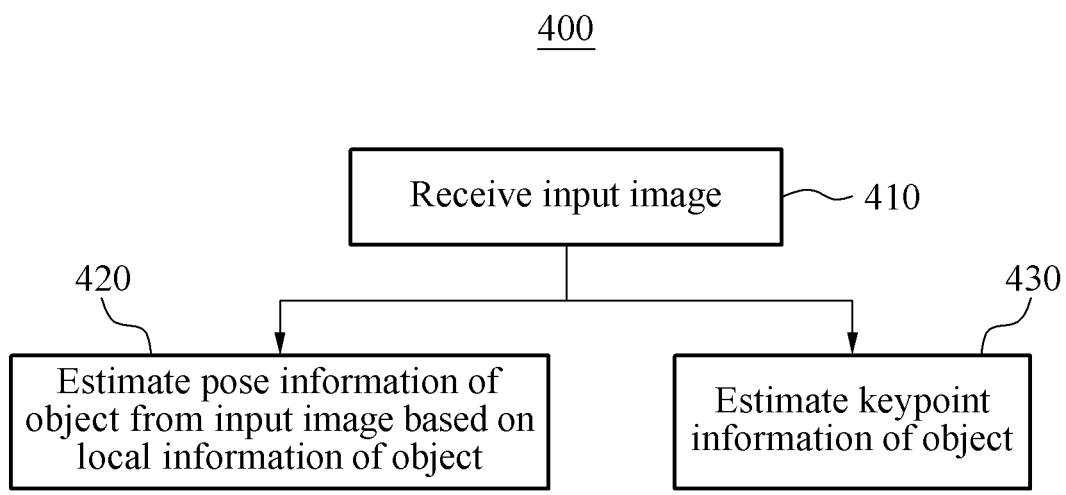
FIG. 4 illustrates an example of a pose estimation method using keypoint information of an object.

FIG. 4 is a diagram illustrating an example of a pose estimation method using keypoint information of an object. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

FIG. 4 illustrates a pose estimation method 400 to be performed by a pose estimation apparatus to estimate a pose of an object using keypoint information of the object. Referring to FIG. 4, in operation 410, the pose estimation apparatus receives an input image.

In operation 420, the pose estimation apparatus estimates pose information of the object from the input image based on local information of the object. When estimating the pose information of the object, the pose estimation apparatus may use the local information of the object. Thus, the pose estimation apparatus may improve overall or global information of the object based on the local information of the object.

In operation 430, the pose estimation apparatus estimates keypoint information of the object. The pose estimation apparatus concurrently estimates the keypoint information of the object while estimating the pose information of the object. In an example, the pose estimation apparatus may perform operations 420 and 430 in parallel.

In an example, the keypoint information indicates semantic keypoints. That is, keypoints positioned at different positions of the object may be distinguished from one another, and each keypoint may have its own semantic appellation. Not all points indicate same keypoints. For example, a keypoint on a left wing of an airplane is distinguished from a keypoint of a right wing of the airplane. Thus, when estimating keypoints of an object, not only must the keypoint be estimated at a single keypoint, but also which keypoint the keypoint indicates.

A keypoint may represent a local position indicating a certain shape or image feature of an object or a target. For example, a keypoint may be an endpoint of an object, a corner point of the object at which a surface shape changes, and the like.

In operation 420, when estimating the pose information of the object, the pose estimation apparatus may estimate the pose information of the object, and at the same time, improve feature expressivity, or expression ability, used as a feature trained using the estimated keypoint information to estimate the pose information. For example, the pose estimation apparatus may correct the estimated pose information using an intermediate result, for example, a parameter, of the estimated keypoint information.

The performance of the pose estimation method 300 of FIG. 3 or the pose estimation method 400 of FIG. 4 through a neural network will be described in detail with reference to FIGS. 5 through 7. The neural network may be, for example, a convolutional neural network (CNN).

The neural network may consider estimating pose information of an object and estimating keypoint information of the object to be independent tasks, for example, a pose information estimation task and a keypoint information estimation task. The pose information estimation task and the keypoint information estimation task may share parameters of a base layer in the CNN.

To estimate the pose information of the object, the neural network may use the keypoint information of the object that is obtained through different methods. For example, the pose information estimation task and the keypoint information estimation task may be connected through one of a parallel mode and a cascade mode. In the parallel mode, the pose information estimation task and the keypoint information estimation task may have no mutual interaction, except the sharing of the parameters of the base layer. In the cascade mode, an intermediate result of the keypoint information estimation task may be input to the pose information estimation task.

In an example, the pose information estimation task may share the parameters of the base layer with the keypoint information estimation task through the parallel mode, which may be referred to as a parallel neural network.

In another example, the pose information estimation task may be combined with estimated keypoint information of an object through the cascade mode, which may be referred to as a cascade neural network.

In another example, multidimensional or multiscale keypoint information of an object may be estimated, and the estimated multidimensional keypoint information may be combined with the pose information estimation task. This may be referred to as a multidimensional or multiscale neural network.

In the parallel neural network, the cascade neural network, and the multidimensional neural network, tasks may be the same and used to estimate pose information and keypoint information of an object from an input image. In an example, the pose information estimation task may be a main task, and the keypoint information estimation task may be an auxiliary task.

Herein, training the neural network may include three stages: a training data preparing stage, a network configuration designing stage, and a training stage. The training data preparing stage may include labeling training data, for example, labeling pieces of 6DoF pose information and positions and appellations of keypoints for each object in a two-dimensional (2D) or three-dimensional (3D) image. For deep learning of the neural network, a great number of samples, for example, a great number of images and annotation information corresponding to the images, may be needed. The training data may be manually labeled, or existing datasets including such annotation information may be collected.

During the training stage, object image data including keypoints may be used to update network parameters through supervision or management of the keypoints. The trained network may thus have an ability to use keypoint information.

Hereinafter, an example of estimation of 6DoF pose information of an object of n classes is provided for convenience of description. In this example, a total number of keypoints of the object of the n classes is 8, and an input image is a 2D image having three, for example, red, green, and blue (RGB) channels, and a size of 224×224 pixels. This example is provided only for convenience of description, and examples are not limited thereto. For example, the number of keypoints of the object may be less than or greater than 8, and the input image may be a 2D or 3D image having other sizes or of a form different from the example described in the foregoing.

Figure 5:
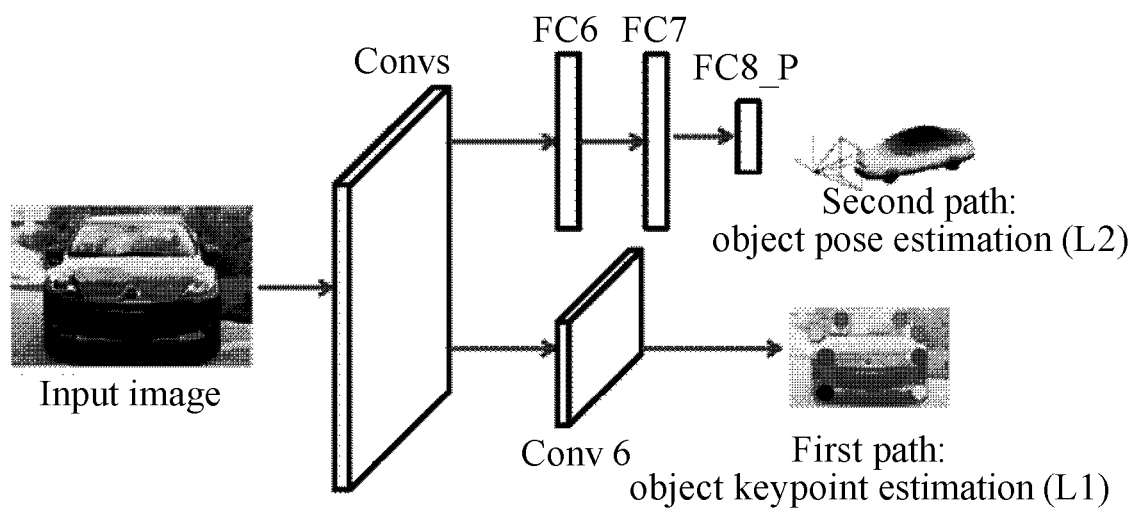
FIG. 5 illustrates an example of a neural network configured to estimate pose information of an object.

FIG. 5 illustrates an example of a neural network configured to estimate pose information of an object.

FIG. 5 illustrates a parallel neural network as an example of a network configured to estimate pose information of an object using keypoint information.

The parallel neural network may perform or include two tasks including an object pose information estimation task and an object keypoint information estimation task. The two tasks may be connected to each other in the parallel neural network through a parallel mode and share parameters of a base layer, or bottom convolution layers (Convs). The two tasks may be divided into different network branches and then learn respective network parameters, for example, network module parameters.

Convs indicates the base layer, which may be convolution layers, or a multi-layer or a multi-convolution layer. Convs is also referred to as the base layer and may be embodied in various architectures.

For example, Convs may use a network layer in front of pooling layer 5 (pool5) of visual geometry group (VGG) 16 and include a total of 13 convolution layers. Herein, a convolution layer is an elementary unit of a neural network, but not limited thereto. In addition to VGG16, such networks as Alex, Net, ResNet, and the like may be handled with Convs.

In a neural network, a base layer or a bottom layer indicates a network layer close to an input, for example, an image input, and a top layer indicates a network layer close to a result output.

In the parallel neural network, after Convs of the base layer, the parallel neural network may be divided into two paths—a first path and a second path. The first path may be used to estimate keypoint information of an object and include the base layer and one or more convolution layers. The second path may be used to estimate pose information of the object and include the base layer and one or more fully-connected layer, which is indicated as FC in the examples illustrated in the drawings.

As illustrated in FIG. 5, in the first path, after Convs of the base layer, an output of Convs of the base layer is connected to a convolution layer Conv6. The number of channels of the convolution layer Conv6 may be equal to a total number of keypoints of the object. For example, in a case of eight keypoints of the object, the number of channels of the convolution layer Conv6 may be set to be eight. The convolution layer Conv6 may include a convolution kernel of a size of 3×3. After a convolution by the convolution kernel, each channel may have a size of 7×7. Thus, a size of an output of the convolution layer Conv6 may be 8×7×7, but not limited thereto. The size of the convolution kernel of the convolution layer Conv6 and the size of channels passing through the convolution may also be set differently.

Although it is illustrated in the example of FIG. 5 that the first path includes a single convolution layer, for example, Conv6, the first path is not limited to the illustrated example and the first path may include two or more convolution layers.

When setting a true value or a real value during the keypoint information estimation task, the network may set a keypoint of the object to be a single channel to identify the keypoint of the object from other positions. With respect to each semantic keypoint in a channel, the value may be 1 when a keypoint is present, or 0 otherwise.

In a neural network, each task may need a loss function during training. The keypoint information estimation task may use a cross-entropy loss function as such a loss function. The output of the convolution layer Conv6 may be connected to the loss function, that is the cross-entropy loss function of the keypoint information estimation task. The loss function is indicated as L1 in the example of FIG. 5. The cross-entropy loss function may be applied to various or multiple classes of object.

In the second path, the output of Convs of the base layer, for example, an output of the pooling layer pool5 is connected to two fully-connected layers FC6 and FC7 in sequential order, and an output of FC7 is connected to a fully-connected layer FC8_P.

For example, the number of network nodes of the fully-connected layers FC6 and FC7 may be set to be 4096. That is, an output of the fully-connected layers FC6 and FC7 may be a vector of a size of 1×4096, but is not limited thereto. The number of the network nodes of the fully-connected layers FC6 and FC7 may be set differently.

Each node of the fully-connected layer FC8_P may correspond to pose information of one DoF. Thus, to estimate 6DoF pose information, the number of nodes of the fully-connected layer FC8_P may be set to be 6.

The pose information estimation task may be a regression model and a classification model. The regression model may be associated with continuous values of estimated or predicted pose, and the classification model may be associated with classes or categories of estimated pose. Here, one of the two models may be used. A loss function, for example, a smooth_L1 loss function, may be used to estimate continuous values and a loss function, for example, a softmax loss function, may be used to estimate a class of a pose. However, examples are not limited to the example described in the foregoing and other loss functions including, for example, a hinge loss function, may also be used.

It is assumed herein that the regression model is used for convenience of description. The output of the fully-connected layer FC8-P may be connected to the loss function of the pose information estimation task, for example, the smooth_L1 loss function which is indicated as L2 in the example of FIG. 5.

Although it is illustrated in the example of FIG. 5 that the first path includes only a single convolution layer, for example, Conv6, examples are not limited to the illustrated example and the first path may include two or more convolution layers.

Although it is illustrated in the example of FIG. 5 that the second path includes three fully-connected layers, for example, FC6, FC7, and FC8_P, examples are not limited to the illustrated example and the second path may include one or more, or two or more fully-connected layers.

In the parallel neural network illustrated in the example of FIG. 5, the first path of the keypoint information estimation task may be connected closer to Convs of the base layer, and the parameters of the base layer may be shared with the pose information estimation task. Similarly, intermediate results of estimating the keypoint information of the object, for example, various parameters, may be fed forward to the base layer. Thus, the keypoint information of the object may be used to correct estimated pose information of the object. During training, the parallel neural network of such an architecture as illustrated in FIG. 5, may improve an underlying feature expression ability.

In the parallel neural network, the pose information estimation task and the keypoint information estimation task may share the network parameters of the base layer and be trained individually in parallel to each other at a top level.

In an example, when training the parallel neural network, training data may be transferred to the network, and a weighted summation of loss functions of all the tasks in the network including the pose information estimation task and the keypoint information estimation task may be used as a final loss function.

In an example, the training data may include an input image of a size of 224×224 and corresponding annotation information, for example, pose and keypoint annotations. The final loss function of the parallel neural network may be indicated as L=a*L1+b*L2, where a and b denote weights, and L1 and L2 denote the loss functions of the keypoint information estimation task and the pose information estimation task, respectively.

By adjusting a weight of a loss function of each task, the pose information estimation task, which is a main task, may obtain an optimal effect.

For example, the weight b of the pose information estimation task, which is a main task, may be set to be a greatest value, for example, 1, and the weight a of the keypoint information estimation task may be set to be 0.01. When the final loss function of the network converges, the training may be terminated.

Figure 6:
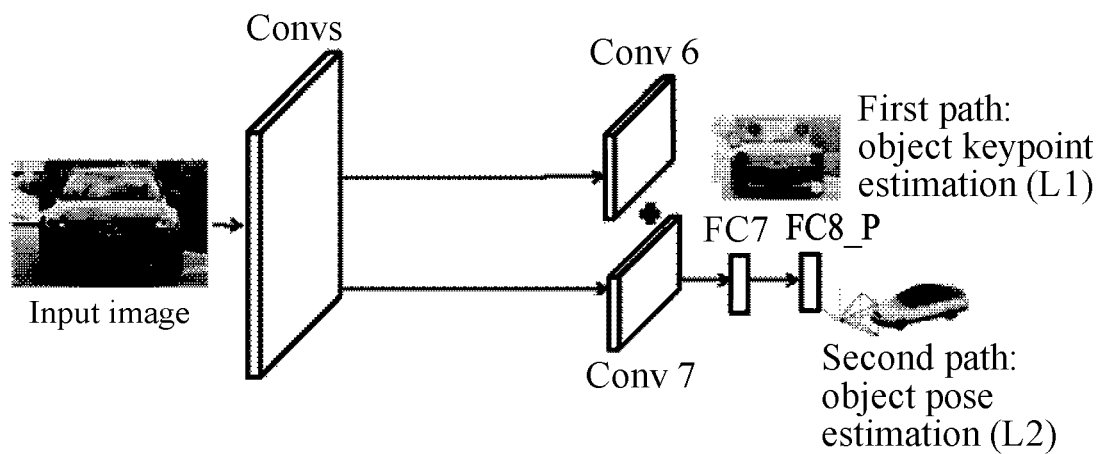
FIG. 6 illustrates another example of a neural network configured to estimate pose information of an object.

FIG. 6 illustrates another example of a neural network configured to estimate pose information of an object.

FIG. 6 illustrates another example of a cascade neural network of a network configured to estimate pose information of an object using keypoint information.

In the cascade neural network, after Convs of a base layer, the cascade neural network may be divided into two paths—a first path and a second path. The first path may be used to estimate keypoint information of an object and include the base layer and one or more convolution layers. The second path may be used to estimate pose information of the object and include the base layer, one or more convolution layers, and one or more fully-connected layers.

In an example, an output of one of the convolution layers in the first path may be connected to an output of one of the convolution layers in the second path.

The cascade neural network may include an object pose information estimation task and an object keypoint information estimation task. These two tasks may share parameters of the base layer in Convs.

In an example, the cascade neural network may be different from the parallel neural network illustrated in FIG. 5 in that a convolution layer Conv7 is added to the second path of the cascade neural network and an output of Convs of the base layer may be an input of the convolution layer Conv7 which is a layer subsequent to the sharing layer. In a top layer, the output of the convolution layer Conv7 may be combined with or connected to an output of a convolution layer Conv6 in the first path in series, and thus become an input of a fully-connected layer FC7 of the pose information estimation task.

That is, the pose information estimation task and the keypoint information estimation task may be connected to each other at a top level through a cascade mode. An arrangement of the parallel neural network in the example of FIG. 5 may be similar to that of such a series or cascade neural network, which will be described in detail hereinafter.

As illustrated in FIG. 6, in the first path, the output of Convs of the base layer is input to the convolution layer Conv6, which corresponds to the keypoint information estimation task. The number of channels of the convolution layer Conv6 may be equal to a total number of keypoints. For example, in a case of eight keypoints, the number of channels of the convolution layer Conv6 may be set to be eight.

The convolution layer Conv6 may include a convolution kernel of a 3×3 size, and each channel after a convolution by the convolution kernel may have a 7×7 size. Thus, a size of an output of the convolution layer Conv6 may be 8×7×7. The output of the convolution layer Conv6 may be connected to a loss function, for example, a cross-entropy loss function, of the keypoint information estimation task. The loss function is indicated as L1 in the example of FIG. 6.

In the second path, the output of Convs of the base layer may be connected to the convolution layer Conv7. The number of channels of the convolution layer Conv7 may be set to be eight which is equal to that of the convolution layer Conv6. The convolution layer Conv7 may include a convolution kernel of a 3×3 size.

A size of each channel after a convolution by the convolution kernel may be 7×7, and a size of the output of the convolution layer Conv7 may be 8×7×7. The output of the convolution layer Conv6 and the output of the convolution layer Conv7 may be combined.

For example, the output of the convolution layer Conv6 may be a confidence map of estimated keypoint information of the object. The confidence map may be of a matrix form. The combining may include addition, point multiplication, and splicing, but is not limited thereto.

In a case in which the output of the convolution layer Conv6 is added to the output of the convolution layer Conv7, output matrices of the two layers may be added point-to-point. A result of combining the output of the convolution layer Conv6 and the output of the convolution layer Conv7 may be input to a fully-connected layer FC7. In an example, the number of network nodes of the fully-connected layer FC7 may be set to be 4096.

An output of the fully-connected layer FC7 is connected to a fully-connected layer FC8_P. The fully-connected layer FC8_P may correspond to pose estimation. The number of nodes of the fully-connected layer FC8_P may correspond to pose information of one DoF of the object. To estimate 6DoF pose information, the number of nodes of the fully-connected layer FC8_P may be set to be six. An output of the fully-connected layer FC8_P may be connected to a loss function, for example, a smooth_L1 loss function, of the pose information estimation task. The loss function is indicated as L2 in the example of FIG. 6.

Although it is illustrated in the example of FIG. 6 that the first path includes one convolution layer, for example, the convolution layer Conv6, examples are not limited to the illustrated example and the first path may include two or more convolution layers. In the first path, one or more convolution layers may be parallel or cascaded.

In addition, although it is illustrated in the example of FIG. 6 that the second path includes one convolution layer, for example, the convolution layer Conv7, and two fully-connected layers, for example, the fully-connected layers FC7 and FC8_P, examples are not limited to the illustrated example and the second path may include other numbers of convolution layers and fully-connected layers.

In the first path, one or more convolution layers may be the same or different in dimension. In addition, an output of a convolution layer of a dimension in the first path and an output of a convolution layer in the second path may be selected and connected to each other. Herein, different dimensions may indicate different sizes, and multidimension or multiscale may indicate multiple sizes, which may indicate matrices of different sizes with respect to convolution layers.

In the cascade neural network illustrated in the example of FIG. 6, the keypoint information, for example, the confidence map of the estimated keypoint information, may be combined with the second path through the cascade mode. The combining may include, for example, addition, point multiplication, splicing, stitching, and the like. By connecting confidence maps of the keypoint information during the pose information estimation task, the keypoint information may be used to improve feature expressivity.

When training the cascade neural network, training data may be transferred to the network, and a weighted summation of loss functions of all the tasks in the network including the pose information estimation task and the keypoint information estimation task may be used as a final loss function. The training data may include an input image of a size of 224×224 and corresponding annotation information, for example, pose and keypoint annotations.

The final loss function of the cascade neural network may be indicated as L=a*L1+b*L2, where a and b denote weights, and L1 and L2 denote the loss functions of the keypoint information estimation task and the pose information estimation task, respectively. By adjusting a weight of a loss function of each task, the pose information estimation task, which is a main task, may obtain an optimal effect.

For example, the weight b of the pose information estimation task, which is a main task, may be set to be a greatest value, for example, 1, and the weight a of the keypoint information estimation task may be set to be 0.01. When the final loss function of the network converges, the training may be terminated.

Figure 7:
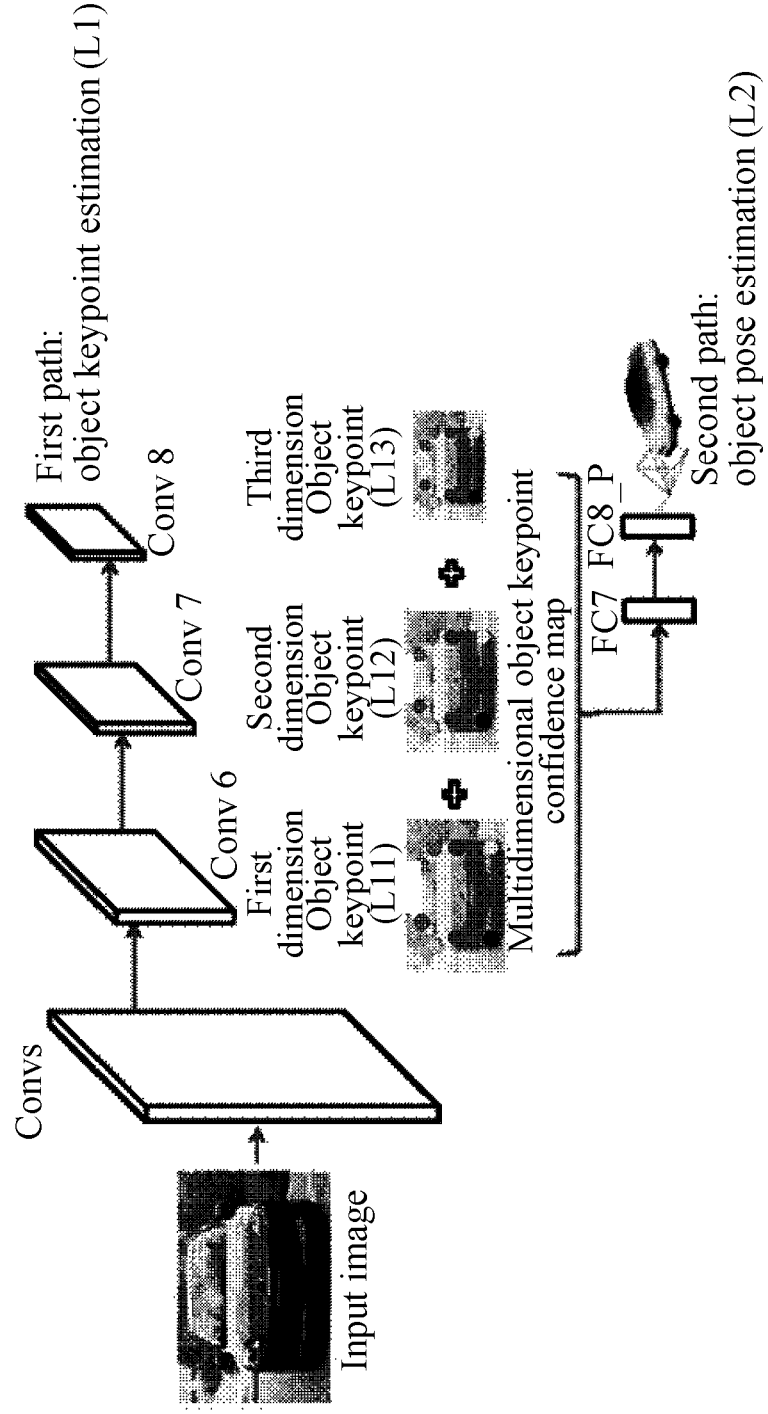
FIG. 7 illustrates another example of a neural network configured to estimate pose information of an object.

FIG. 7 illustrates still another example of a neural network configured to estimate pose information of an object.

FIG. 7 illustrates a multidimensional neural network as another example of a network configured to estimate pose information of an object using keypoint information.

The multidimensional neural network may include two paths—a first path and a second path. The first path may be used to estimate keypoint information of an object and include a base layer and one or more convolution layers. The second layer may be used to estimate pose information of the object and include the base layer, one or more convolution layers, and one or more fully-connected layers. Herein, an output of two or more of the convolution layers in the first path may be connected and input to one of the fully-connected layers in the second path.

The multidimensional neural network may combine multidimensional keypoint information when estimating pose information of the object. For example, the multidimensional neural network may use one or more confidence maps of the keypoint information, and the one or more confidence maps may have different dimensions.

As illustrated in FIG. 7, the first path includes a plurality of convolution layers, for example, Conv6, Conv7, and Conv8 that have different dimensions. A combined output of the convolution layers Conv6, Conv7, and Conv8 is input to a fully-connected layer FC7 during the pose information estimation task. That is, the second path may include one or more convolution layer in the first path.

The multidimensional neural network illustrated in FIG. 7, the cascade neural network illustrated in FIG. 6, and the parallel neural network illustrated in FIG. 5 may be similar in terms of a network arrangement, and thus a loss function of the multidimensional neural network may be the same as those of the two networks described above.

As illustrated in FIG. 7, the multidimensional neural network may include the pose information estimation task and the keypoint information estimation task. The pose information estimation task and the keypoint information estimation task may share parameters of the base layer in convolution layers Convs.

In an example, the pose information estimation task may not be directly connected to the convolution layers Convs, an error of the pose information estimation task may be reversely transferred to the convolution layers Convs. Thus, the two tasks may share the parameters of the base layer in the convolution layers Convs.

In the first path, the multidimensional neural network may estimate keypoints in multidimensional convolution layers to use the keypoints more conveniently and combine multidimensional keypoint information to estimate a pose of the object. For example, confidence maps of the multidimensional keypoint information may be combined to be used for the pose information estimation task. Herein, different dimensions may indicate different sizes, and a multidimension or multiscale may indicate a multi-size, which may indicate matrices of different sizes with respect to convolution layers. Although it is illustrated in the example of FIG. 7 that the multidimensional neural network uses three types of dimensions, examples are not limited to the illustrated example and the multidimensional neural network may use a lesser or greater number of types of dimensions. For example, in the first path, two or more pieces of keypoint information may be selected and combined.

The combining of the confidence maps of the multidimensional keypoint information may include, for example, addition, point multiplication, splicing, stitching, and the like.

In detail, the output of the convolution layers Convs may be input to the convolution layer Conv6 which may correspond to the keypoint information estimation task. Herein, the number of channels of the convolution layer Conv6 may be equal to a total number of keypoints.

For example, in a case of eight keypoints of an object, the number of channels of the convolution layer Conv6 may be set to be eight. An output of the convolution layer Conv6 is connected to a loss function, for example, a cross-entropy loss function, of the keypoint information estimation task. The loss function is indicated as L11 in the example of FIG. 7. Herein, a path of Convs→Conv6→cross entropy function may be one dimension of the keypoint information estimation task.

In an example, the output of the convolution layer Conv6 is additionally input to the convolution layer Conv7. The convolution layer Conv7 may also correspond to the keypoint information estimation task. An output of the convolution layer Conv7 is connected to a loss function, for example, a cross-entropy loss function, of the keypoint information estimation task. The loss function is indicated as L12 in the example of FIG. 7. Herein, a path of Convs→Conv6→Conv7→cross entropy function may be a second dimension of the keypoint information estimation task.

In an example, the output of the convolution layer Conv7 is additionally input to a convolution layer Conv8. The convolution layer Conv8 may also correspond to the keypoint information estimation task. An output of the convolution layer Conv8 is connected to a loss function, for example, a cross-entropy loss function, of the keypoint information estimation task. The loss function is indicated as L13 in the example of FIG. 7. A path of Convs→Conv6→Conv7→Conv8→cross entropy function may be a third dimension of the keypoint information estimation task.

In an example, the convolution layers Conv6, Conv7, and Conv8 may have the same number of channels. Since the dimensions of the output results of the convolution layers Conv6, Conv7, and Conv8 after convolutions are different, output matrices of these three layers may be combined to be a same dimension, for example, 28×28. For example, the dimension of the convolution layer Conv6 may be 28×28, the dimension of the convolution layer Conv7 may be 14×14, and the dimension of the convolution layer Conv8 may be 7×7.

The combining may include addition, point multiplication, splicing, stitching, and the like. In a case of the addition, the output results of the convolution layers Conv6, Conv7, and Conv8 may be added point-to-point, and a result of the adding may be input to a fully-connected layer FC7. The number of network nodes of the fully-connected layer FC7 may be set to be 4096.

In the second path, an output of the fully-connected layer FC7 is connected to a fully-connected layer FC8_P. The fully-connected layer FC8_P may correspond to the pose information estimation task. Each node of the fully-connected layer FC8_P may correspond to pose information of one DoF of the object. Thus, to estimate 6DoF pose information, the number of nodes of the fully-connected layer FC8_P may be set to be 6.

An output of the fully-connected layer FC8_P is connected to a loss function, for example, a smooth_L1 loss function, of the pose information estimation task. The loss function is indicated as L2 in the example of FIG. 7. The second path of Convs→(Conv6+Conv7+Conv8)→FC7→FC8_P→smooth_L1 loss function may correspond to the pose information estimation task.

However, examples are not limited to the example described in the foregoing, and the number of nodes of the fully-connected layer FC6 and the number of nodes of the fully-connected layer FC7 may be different. In addition, the sizes of convolution kernels of the convolution layers Conv6, Conv7, and Conv8, and the sizes of channels thereof passing through the convolutions may be differently set.

In the example of FIG. 7, the convolution layers Conv6, Conv7, and Conv8 may be cascaded and the dimensions may be gradually reduced. However, examples are not limited to the example described in the foregoing. The convolution layers Conv6, Conv7, and Conv8 may be in parallel. For example, the convolution layers Conv6, Conv7, and Conv8 may be all connected to Convs of the base layer. In addition, the dimensions of the convolution layers Conv6, Conv7, and Conv8 may be different from one another.

Although it is illustrated in the example of FIG. 7 that the first path includes the three convolution layers Conv6, Conv7, and Conv8, examples are not limited thereto. The first path may include fewer or more convolution layers, and the convolution layers may be in parallel or cascaded.

Although it is illustrated in the example of FIG. 7 that the second path includes the two fully-connected layers FC7 and FC8_P, examples are not limited thereto. The second path may include a different number of fully-connected layers.

Although it is illustrated in the example of FIG. 7, an output of the convolution layers Conv6, Conv7, and Conv8 is connected to the first fully-connected layer FC7 in the second path, it is possible to select outputs of two or more convolution layers from among the one or more convolution layers in the first path and connect the selected outputs to the second path. In addition, it is possible to connect them as an input to a fully-connected layer in the second path.

When training the multidimensional CNN, training data may be transferred to the network and a weighted summation of the loss functions of all the tasks including the pose information estimation task and the keypoint information estimation task may be used as a final loss function. Herein, the training data may include an input image of a size of 224×224 and corresponding annotation information, for example, pose and keypoint annotations.

The final loss function of the multidimensional neural network may be represented as $L=a*(L11+L12+L13)+b*L2$, where a and b denote weights. $L11+L12+L13$ and $L2$ denote a loss function of the keypoint information estimation task and a loss function of the pose information estimation task, respectively. By adjusting a weight of a loss function of each task, the pose information estimation task, which is a main task, may obtain an optimal effect.

For example, the weight b of the pose information estimation task, which is a main task, may be set to be a greatest value, for example, 1, and the weight a of the keypoint information estimation task may be set to be 0.01. When the final loss function converges, the training may be terminated.

As described above with reference to FIGS. 5 through 7, by inputting a single test image to one of a parallel neural network, a cascade neural network, and a multidimensional neural network for which training is completed, it is possible to output pose information and keypoint information of an object in the input image. As illustrated, a six-dimensional vector value output from the fully-connected layer FC8_P in the second path of the three networks may be estimated 6DoF pose information. In addition, lengths and widths of output matrices of the convolution layers Conv6, Conv7, and Conv8 of the three networks may be normalized to have the same as a size of an existing input image. A position coordinate of a maximum value of each channel may be one keypoint, and each channel may correspond to a name of one keypoint.

In addition, by combining at least two results of pose estimation from the parallel neural network, the cascade neural network, and the multidimensional neural network, a combined result may be used as a final result of the pose estimation. The combining may include obtaining a maximum value, obtaining a mean value, and obtaining a weighted sum, but not limited thereto.

Figure 8:
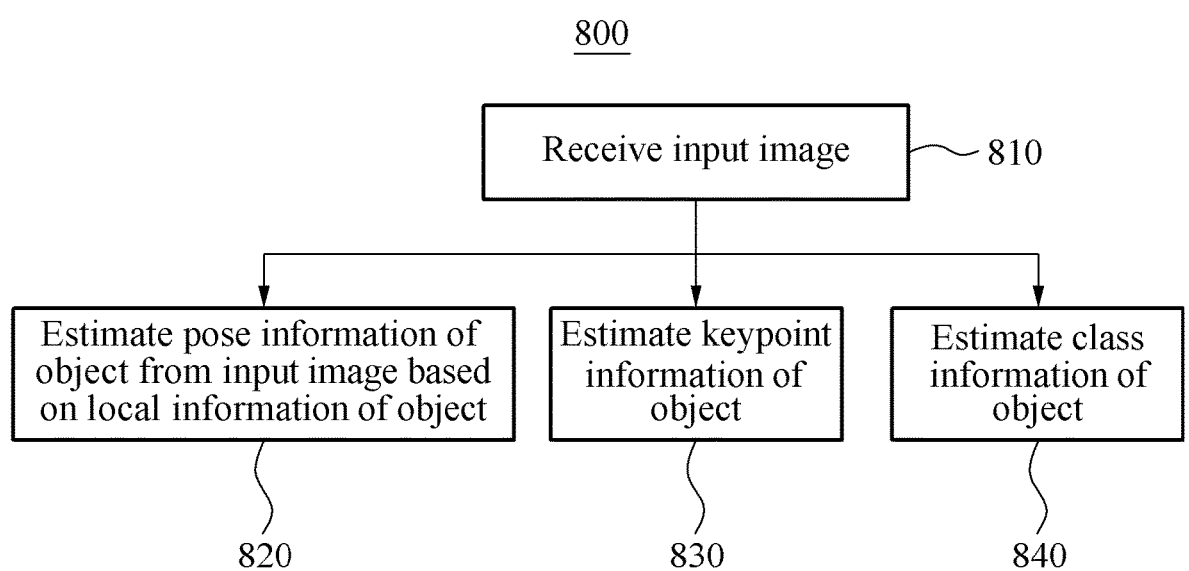
FIG. 8 illustrates an example of a pose estimation method using class information of an object.

FIG. 8 is a diagram illustrating an example of a pose estimation method using class information of an object. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

FIG. 8 illustrates a pose estimation method 800 to be performed by a pose estimation apparatus using class information of an object. Referring to FIG. 8, in operation 810, the pose estimation apparatus receives or obtains an input image.

In operation 820, the pose estimation apparatus estimates pose information of the object from the input image based on local information of the object. When estimating the pose information of the object, the pose estimation apparatus may use the local information of the object. Thus, the pose estimation apparatus may improve overall or global information of the object based on the local information of the object.

In operation 830, the pose estimation apparatus estimates keypoint information of the object. In operation 840, the pose estimation apparatus also estimates class information of the object.

The pose estimation apparatus may concurrently estimate the class information of the object while estimating the pose information of the object and the keypoint information of the object. Thus, the pose estimation apparatus may perform operations 820, 830, and 840 in parallel.

The pose estimation apparatus may additionally use the class information and may thus improve accuracy of the estimated pose information of the object.

In a neural network, a pose information estimation task which is a task of estimating the pose information of the object, a keypoint information estimation task which is a task of estimating the keypoint information of the object, and a class information estimation task which is a task of estimating the class information of the object may share parameters of a base layer of the neural network.

Operation 840 of estimating the class information of the object may be added to one of the parallel neural network, the cascade neural network, and the multidimensional neural network which are described above with reference to FIGS. 5 through 7.

Figure 9:
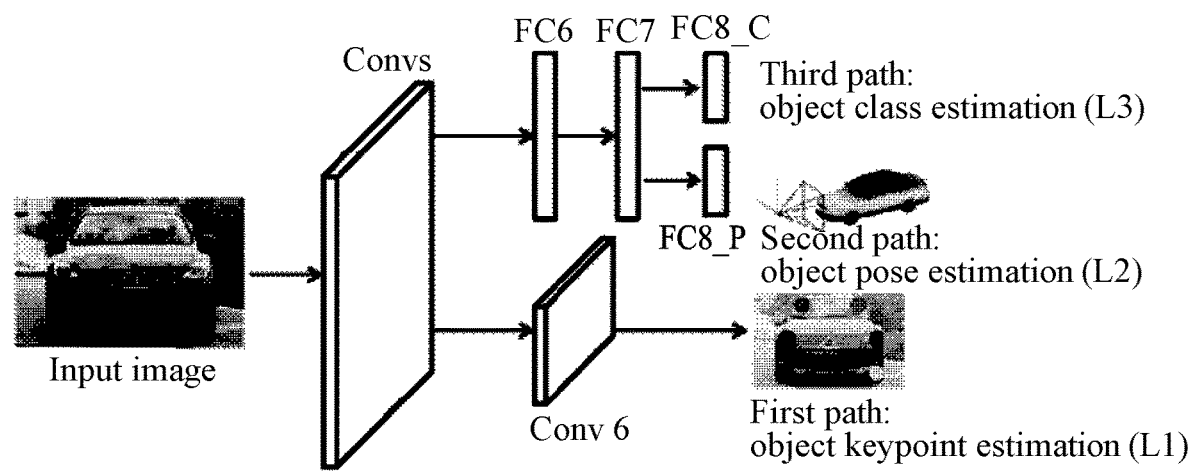
FIG. 9 illustrates another example of a neural network configured to estimate pose information of an object.

FIG. 9 illustrates another example of a neural network configured to estimate pose information of an object.

FIG. 9 illustrates a parallel neural network as an example of a network configured to estimate pose information of an object using keypoint information and class information of the object.

The parallel neural network illustrated in FIG. 9 may be different from the parallel neural network illustrated in FIG. 5. In an example, the parallel neural network illustrated in FIG. 9 may further include a third path. The third path may be used to estimate class information of an object and include a base layer and one or more fully-connected layers.

As illustrated in FIG. 9, the parallel neural network includes a class information estimation task, a pose information estimation task, and a keypoint information estimation task. These three tasks are processed through a parallel mode in the parallel neural network and share parameters of the base layer in convolution layers Convs, and are divided into different network branches to learn respective network module parameters.

Herein, Convs may be the base layer, which may be convolution layers, multilayers, or multi-convolution layers, for example. Convs may also be referred to as the base layer and may be embodied in various architectures. For example, Convs may use a network layer in front of pooling layer 5 (pool5) of VGG16 and include a total of 13 convolution layers. In this example, a convolution layer is an elementary unit of a neural network, but not limited thereto. In addition to VGG16, such networks as Alex, Net, ResNet, and the like may be handled with Convs.

After Convs of the base layer, the parallel neural network may be divided into two branches or two paths. An output of Convs of the base layer is connected to two fully-connected layers FC6 and FC7 in sequential order. In addition, an output of the fully-connected layer FC7 is concurrently connected to a fully-connected layer FC8_C and another fully-connected layer FC8_P.

Although it is illustrated in the example of FIG. 9 that the second path and the third path share the fully-connected layers FC6 and FC7, the second path and the third path may include respective fully-connected layers.

For example, the numbers of network nodes of the fully-connected layers FC6 and FC7 may be set to be 4096. That is, the output of the fully-connected layers FC6 and FC7 may be a vector of a 1×4096 size, but not limited thereto. The numbers of network nodes of the fully-connected layers FC6 and FC7 may be set differently.

The fully-connected layer FC8_C may correspond to the class information estimation task. Herein, the number of nodes thereof may be equal to the total number of classes of object. For example, in a case of 12 classes of object, the number of nodes of the fully-connected layer FC8_C may be set to be 12.

The class information estimation task may use a softmax loss function, for example. However, examples are not limited to the example described in the foregoing, and other loss functions such as, for example, a hinge loss function, may be used. An output of the fully-connected layer FC8_C is connected to a loss function, for example, a softmax loss function, of the class information estimation task. The loss function is indicated as L3 in the example of FIG. 9. Herein, a path of Convs→FC6→FC7→FC8_C→softmax loss function may correspond to the class information estimation task.

An arrangement of the second path is substantially the same as that of the second path illustrated in FIG. 5, and the descriptions of FIG. 5 are also applicable to FIG. 9, and are incorporated herein by reference. Thus, a detailed and repeated description is omitted here for brevity.

The first path is associated with a plurality of classes of object, and thus the number of channels of a base layer Conv6 may be equal to a total number of keypoints of all the classes. For example, in a case in which there are a total of 124 pieces of keypoint information for 12 classes of object, the number of channels of the base layer Conv6 may be set to be 124.

The base layer Conv6 may include a convolution kernel of a 3×3 size. Each channel passing through a convolution by the convolution kernel may have a 7×7 size and an output of the base layer Conv6 may be of a size 124×7×7. However, examples are not limited to the example described in the foregoing, and the size of the convolution kernel of the convolution layer Conv6 and the number of channels passing through the convolution may be set differently.

Although it is illustrated in the example of FIG. 9 that the first path includes only the convolution layer Conv6, examples are not limited to the illustrated example and the first path may include two or more convolution layers.

When setting a true value in the keypoint information estimation task, a keypoint of an object may be set to be one channel such that the network may identify keypoints of the object at different positions. When a semantic keypoint is present in a channel, the value may be set to be 1, or to be 0 otherwise.

The keypoint information estimation task may use a cross-entropy loss function as a loss function thereof. The output of the base layer Conv6 is connected to the loss function, for example, the cross-entropy loss function of the keypoint information estimation task. The loss function is indicated as L1 in the example of FIG. 9. The cross-entropy loss function may be applied to numerous or multiple classes of object and may thus be used to estimate keypoint information of a plurality of objects.

Similar to the architecture or configuration of the parallel neural network illustrated in FIG. 5, the parallel neural network illustrated in FIG. 9 may allow keypoint information to improve an underlying feature expression ability during training.

In the parallel neural network, the class information estimation task, the pose information estimation task, and the keypoint information estimation task may share network parameters of a base layer and may be individually trained in parallel at a top level.

When training the parallel neural network, training data may be transferred to the network, and a weighted summation of the loss functions of all the tasks including the pose information estimation task and the keypoint information estimation task may be used as a final loss function. Herein, the training data may include an input image of a size of 224×224 and corresponding annotation information, for example, pose and keypoint annotations.

The final loss function of the parallel neural network may be represented as $L=a*L1+b*L2+c*L3$, where a, b, and c denote weights and L1, L2, and L3 denote the loss functions of the keypoint information estimation task, the pose information estimation task, and the class information estimation task, respectively. By adjusting a weight of a loss function of each task, the pose information estimation task, which is a main task, may obtain an optimal effect.

For example, the weight b of the pose information estimation task, which is a main task, may be set to be a greatest value, for example, 1. In addition, the weight c of the keypoint information estimation task may be set to be 0.01, and the weight a of the class information estimation task may be set to be a value between 0 and 1. When the final loss function of the network converges, the training may be terminated.

Figure 10:
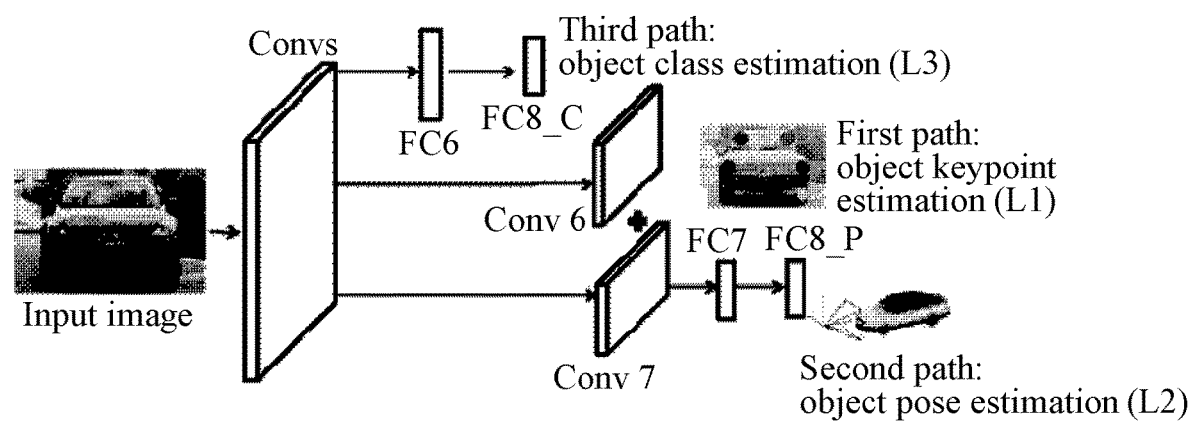
FIG. 10 illustrates another example of a neural network configured to estimate pose information of an object.

FIG. 10 illustrates another example of a neural network configured to estimate pose information of an object.

FIG. 10 illustrates a cascade neural network as an example of a network configured to estimate pose information of an object using keypoint information and class information of the object.

An arrangement of the cascade neural network illustrated in FIG. 10 is similar to that of the cascade neural network illustrated in FIG. 6, except that the cascade neural network illustrated in FIG. 10 further includes a third path to estimate class information of an object. Thus, a more detailed and repeated description will be omitted here for brevity. The third path may include a base layer and one or more fully-connected layers.

A training method and a final loss function of the cascade neural network illustrated in FIG. 10 may be similar to those of the parallel neural network illustrated in FIG. 9, and the descriptions of FIG. 6 are also applicable to FIG. 10, and are incorporated herein by reference. Thus, a more detailed and excessive description will be omitted here for brevity.

Figure 11:
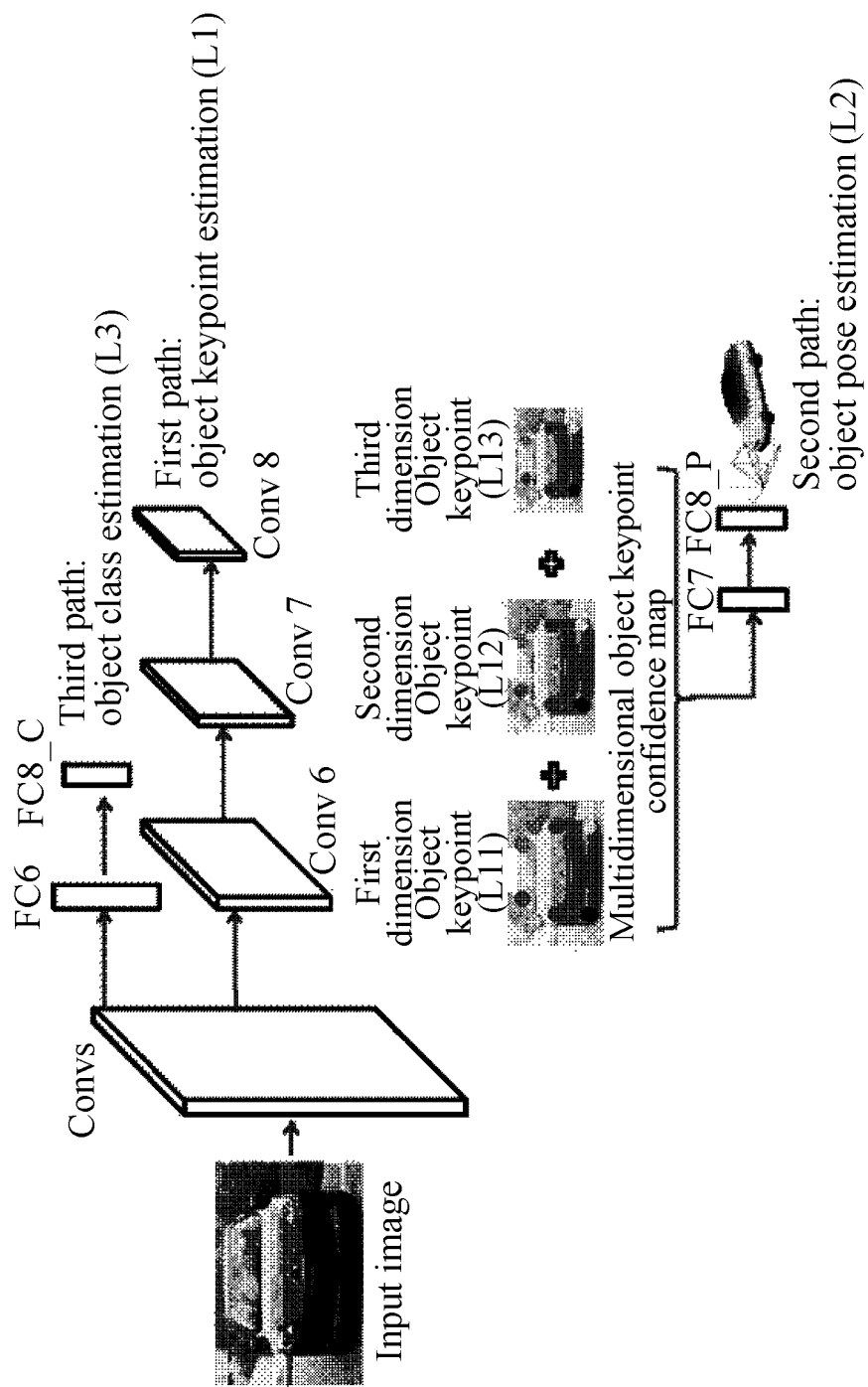
FIG. 11 illustrates another example of a neural network configured to estimate pose information of an object.

FIG. 11 illustrates another example of a neural network configured to estimate pose information of an object.

FIG. 11 illustrates a multidimensional neural network as an example of a network configured to estimate pose information of an object using keypoint information and class information of the object.

An arrangement of the multidimensional neural network illustrated in FIG. 11 is similar to that of the multidimensional neural network illustrated in FIG. 7, except that the multidimensional neural network further includes a third path to estimate class information of an object. The descriptions of FIG. 7 are also applicable to FIG. 11, and are incorporated herein by reference. Thus, a more detailed and excessive description will be omitted here for brevity. The third path may include a base layer and one or more fully-connected layers.

When training the multidimensional neural network, training data may be transferred to the network, and a weighted summation of loss functions of all tasks including a pose information estimation task, a keypoint information estimation task, and a class information estimation task may be used as a final loss function. Herein, the training data may include an input image of a size of 224×224 and corresponding annotation information, for example, pose and keypoint annotations. The final loss function of the multidimensional neural network may be represented as $L=a*(L11+L12+L13)+b*L2+c*L3$, where a, b, and c denote weights, and $L11+L12+L13$, $L2$, and $L3$ denote loss functions of the keypoint information estimation task, the pose information estimation task, and the class information estimation task, respectively. By adjusting a weight of a loss function of each task, the pose information estimation task, which is a main task, may obtain an optimal effect.

For example, the weight b of the pose information estimation task, which is a main task, may be set to be a greatest value, for example, 1. In addition, the weight c of the keypoint information estimation task may be set to be 0.01, and the weight a of the class information estimation task may be set to be a value between 0 and 1. When the final loss function of the network converges, the training may be terminated.

The parallel neural network, the cascade neural network, and the multidimensional neural network illustrated in FIGS. 9 through 11 may improve accuracy in estimating pose information of an object and expand a processing range, and thus more readily process pose information of a greater number of classes of object or more various types of object.

As described above with reference to FIGS. 1 through 11, 3D pose information of 6DoF may be obtained from a single image, and the obtained pose information may be used for rendering a 3D virtual object matched to a real object in an AR and used to assist simultaneous localization and mapping (SLAM). The SLAM may navigate or search for a 3D pose of an object obtained through a depth image sensor or a multiangle image. According to examples described herein, 3D pose information of an object may be obtained from a single image.

Figure 12:
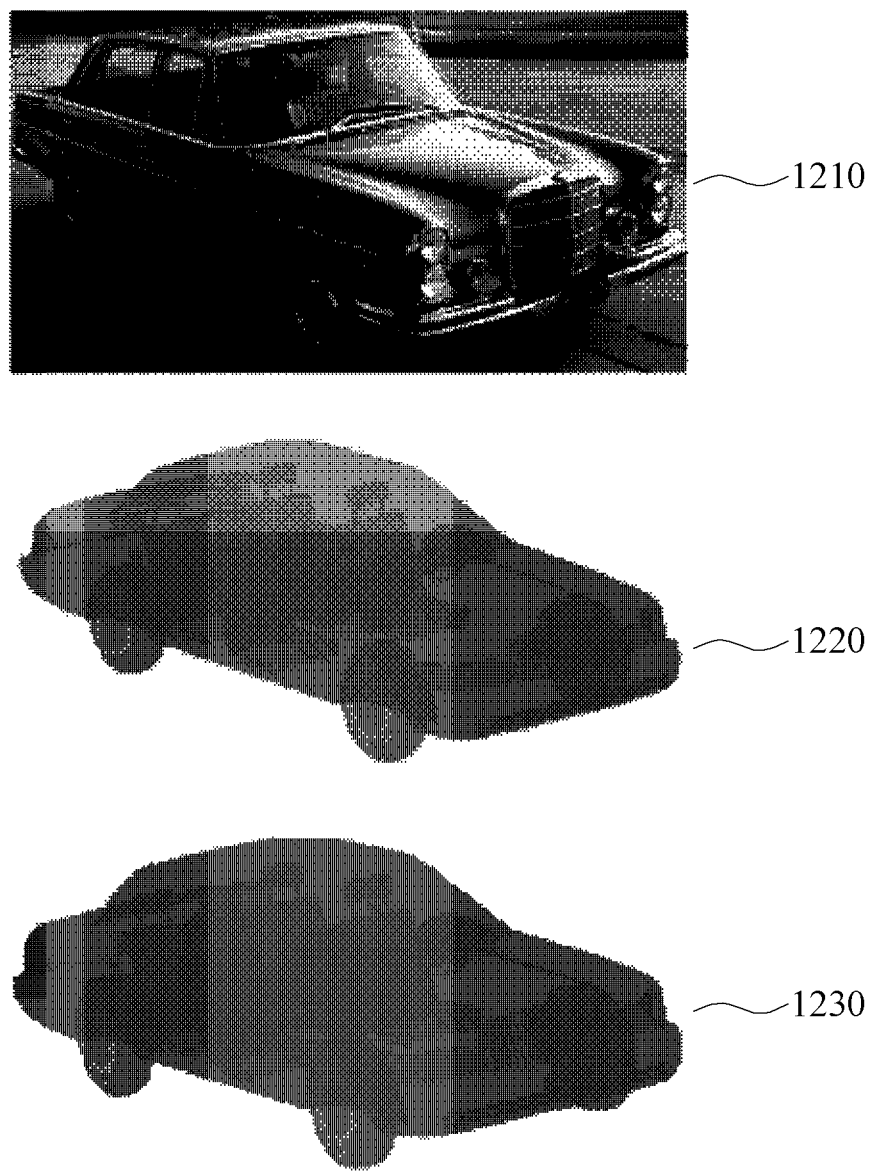
FIG. 12 illustrates an example of rendering used to estimate pose information of an object.

FIG. 12 illustrates an example of rendering used to estimate pose information of an object.

In FIG. 12, an image indicated by numeral 1210, in an upper portion of FIG. 12, illustrates an input test image. An image indicated by numeral 1220, in a middle portion of FIG. 12, illustrates a virtual image obtained from the input test image through rendering performed using a computer-aided design (CAD) model and pose information estimated through a parallel neural network. An image indicated by numeral 1230, in a lower portion of FIG. 12, illustrates a virtual image obtained from the input test image through rendering performed using a CAD model and pose information estimated through a cascade neural network.

Figure 13:
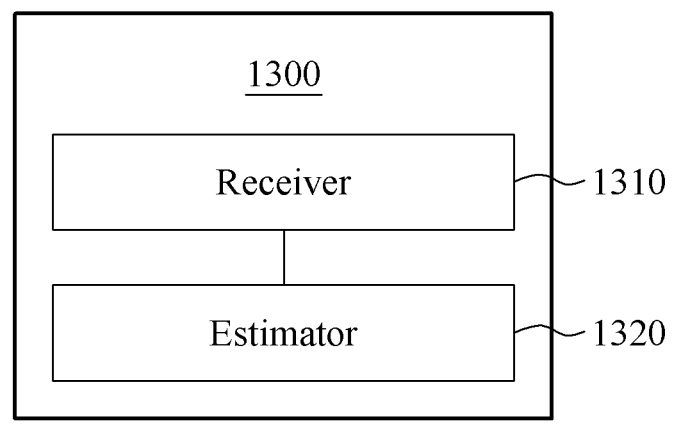
FIG. 13 illustrates an example of a pose estimation apparatus.

FIG. 13 illustrates an example of a pose estimation apparatus.

Referring to FIG. 13, a pose estimation apparatus 1300 includes a receiver 1310 and an estimator 1320. The receiver 1310 receives an input image. The estimator 1320 estimates pose information of an object from the input image. A pose estimation method described above with reference to FIGS. 1 through 12 may be applied to the estimator 1320, and thus a more detailed and repeated description will be omitted here for brevity.

Figure 14:
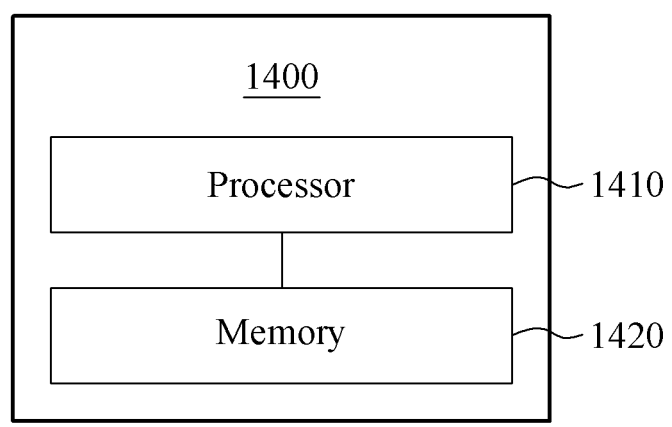
FIG. 14 illustrates another example of a pose estimation apparatus.

FIG. 14 illustrates another example of a pose estimation apparatus.

Referring to FIG. 14, a pose estimation apparatus 1400 includes a processor 1410 and a memory 1420. The memory 1420 stores an instruction to be executed by the processor 1410. When the instruction is executed by the processor 1410, the processor 1410 receives an input image and estimates pose information of an object from the input image. A pose estimation method described above with reference to FIGS. 1 through 13 may be applied to the processor 1410, and thus a more detailed and repeated description will be omitted here for brevity. Further description of the processor 1410 and the memory 1420 is provided below.

Figure 15:
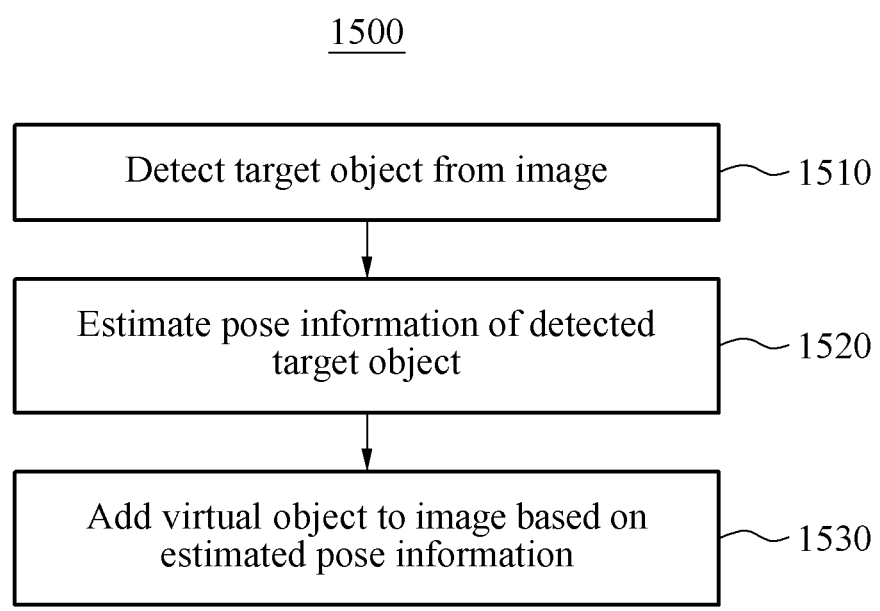
FIG. 15 illustrates an example of a method of displaying a virtual object in an augmented reality (AR) using estimated pose information of an object.

FIG. 15 illustrates an example of a method 1500 of displaying a virtual object in an AR using estimated pose information of an object. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. One or more blocks of FIG. 15, and combinations of the blocks, can be implemented by special purpose hardware-based computer that perform the specified functions, or combinations of special purpose hardware and computer instructions. In addition to the description of FIG. 15 below, the descriptions of FIGS. 1-14 are also applicable to FIG. 15, and are incorporated herein by reference. Thus, the above description may not be repeated here.

Referring to FIG. 15, in operation 1510, a display apparatus detects at least one target object from an image. In operation 1520, the display apparatus estimates pose information of the estimated target object. In operation 1530, the display apparatus displays or adds a virtual image on or to the image based on the estimated pose information of the target object.

Figure 16:
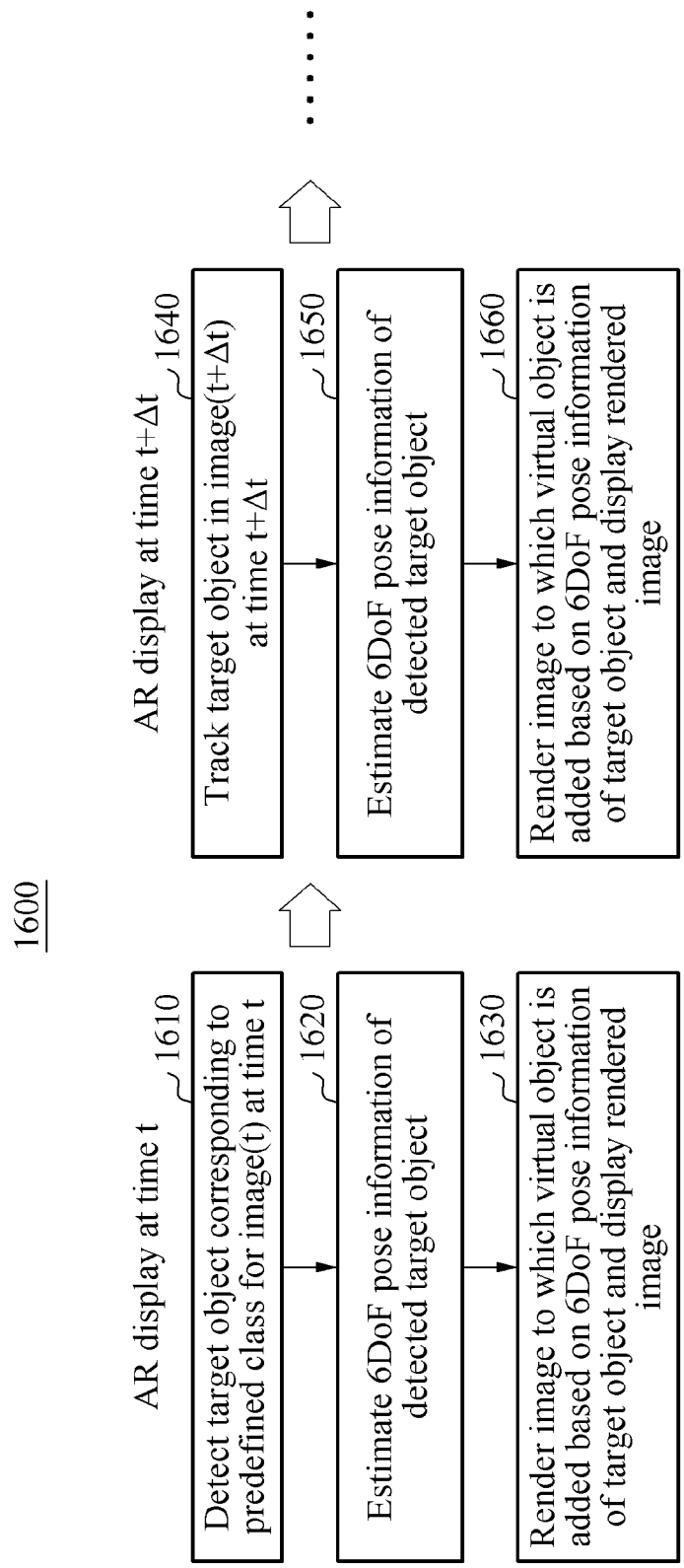
FIG. 16 illustrates an example of a method of displaying a virtual object in an AR using estimated pose information of an object.

FIG. 16 illustrates an example of a method 1600 of displaying a virtual object in an AR using estimated pose information of an object. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer that perform the specified functions, or combinations of special purpose hardware and computer instructions. In addition to the description of FIG. 16 below, the descriptions of FIGS. 1-15 are also applicable to FIG. 16, and are incorporated herein by reference. Thus, the above description may not be repeated here.

Referring to FIG. 16, a display apparatus may render virtual information around a real object. For example, for a desk in a real scene, the display apparatus may render and overlap a virtual pot on the desk in a real image such that it appears that the virtual pot is on a surface of the real desk.

In an example, the display apparatus may display a virtual object in an image, for example, an AR, using pose information of an object estimated from the image. Hereinafter, how the display apparatus detects a desk in an image and adds a virtual pot to the image will be described as an example.

In operation 1610, the display apparatus detects at least one target object corresponding to a class from an image at a time t, for example, an image(t), in an AR display at the time t. In an example, the class of the target object to be detected may be defined in advance. In an example, this target object may appear frequently in an application scene and be a relatively important object in an AR application. In the method 1600, the target object to be detected may be a desk.

In operation 1620, the display apparatus estimates 6DoF pose information of the detected target object, for example, the desk. The display apparatus may estimate the pose information of the desk using a pose estimation method described above with reference to FIGS. 1 through 14.

In operation 1630, the display apparatus adds a virtual object to the image based on the 6DoF pose information of the target object, and renders the image and displays the rendered image.

For example, the display apparatus may use a 3D CAD model of the desk which is the target object to determine an image area and a 3D surface direction to and in which each portion of the desk is projected to the image(t). For example, the display apparatus may obtain information as to which 3D plane of the CAD model of the desk forms a top plate of the desk based on the CAD model of the desk. Thus, the display apparatus may obtain information on a 3D shape and size of the desk model.

The display apparatus may project the desk CAD model to the image based on the estimated pose to determine which image area in the image(t) corresponds to which portion and direction of the desk. The display apparatus may project a 3D CAD model of a virtual pot to an image area corresponding to the desk, and allow a projected pose, for example, pose information, to be the same as a pose of the desk. Through this, the display apparatus may display the virtual pot appearing on the desk. That is, the display apparatus may perform rendering based on 6DoF pose information of a target object to display an image to which a virtual object is added.

The display apparatus may display the virtual object identically for an image at a time t+Δt, for example, an image(t+Δt), where Δt denotes a time interval and t+Δt denotes a time subsequent to the time t. The display apparatus may perform operations 1640 through 1660 for the image image(t+Δt) at the time t+Δt, similar to the operations 1610 through 1630 described above.

After the time t+Δt, operations for displaying at each time may be substantially the same as the operations for displaying at the time t+Δt, and thus a more detailed and repeated description will be omitted for brevity.

Figure 17:
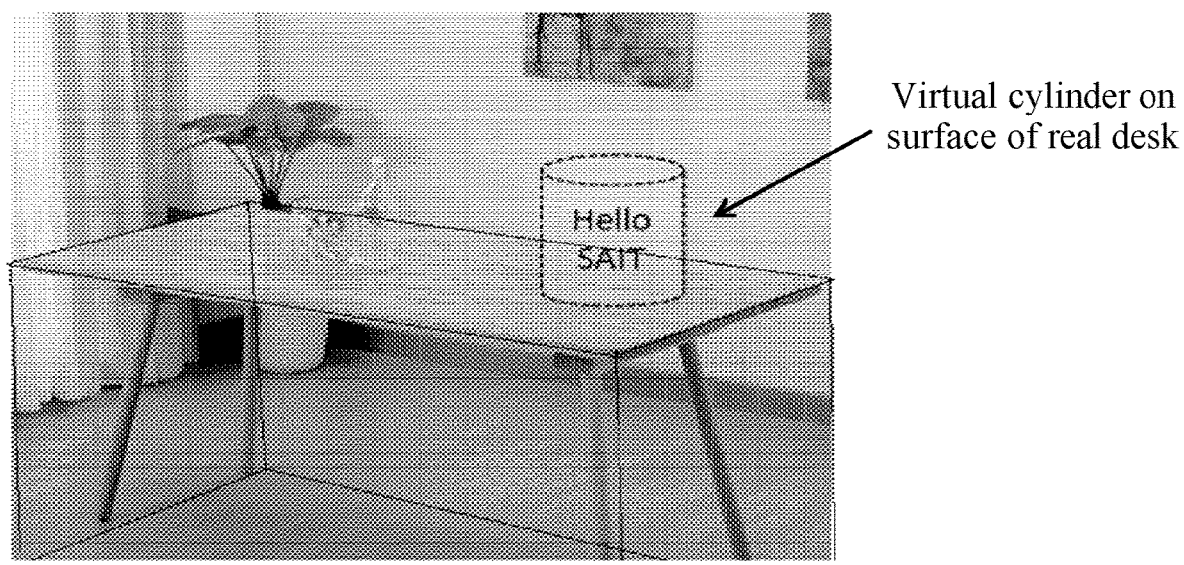
FIG. 17 illustrates an example of displaying a virtual object in an AR using the method illustrated in FIG. 16.

FIG. 17 illustrates an example of how to display a virtual object in an AR using the method described above with reference to FIG. 16.

Referring to FIG. 17, a display apparatus may estimate pose information of a desk and display an image through 3D frame projection. The display apparatus may arrange a virtual cylinder on an actual surface of the desk in the image based on the estimated pose information of the desk. Herein, in an AR image, a pose of the virtual cylinder may be updated based on the estimated pose information of the desk to obtain a realistic visual effect.

Figure 18:
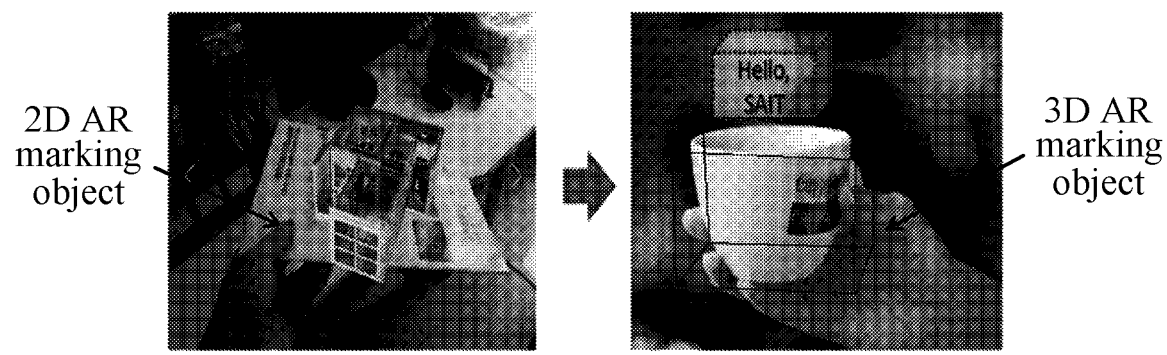
FIG. 18 illustrates another example of displaying a virtual target in an AR using the method illustrated in FIG. 16.

FIG. 18 illustrates another example of how to display a virtual object in an AR using the method described above with reference to FIG. 16.

Referring to FIG. 18, an estimated pose of a real or actual object, for example, a paper and a cup, may be used to control a pose of a virtual object. The real object may also be referred to as a 2D or 3D AR marking object. In the example of FIG. 18, 2D AR marking and 3D AR marking are illustrated. A paper is used for the 2D AR marking, and a cup is used for the 3D AR marking.

Figure 19:
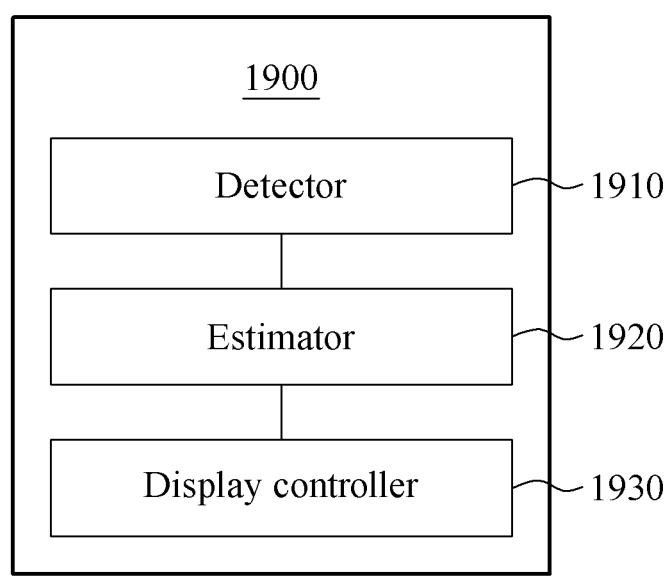
FIG. 19 illustrates an example of a display apparatus for displaying a virtual object in an AR using an estimated pose of an object.

FIG. 19 illustrates an example of a display apparatus for displaying a virtual object in an AR using an estimated pose of an object.

Referring to FIG. 19, a display apparatus 1900 includes a detector 1910, an estimator 1920, and a display controller 1930.

The detector 1910 detects at least one target object from an image.

The estimator 1920 estimates pose information of the detected target object. A pose estimation method described above with reference to FIGS. 1 through 15 may be applied to the estimator 1920. The descriptions of FIGS. 1 through 15 through are also applicable to FIG. 19, and are incorporated herein by reference. Thus, a more detailed and repeated description will be omitted here for brevity.

The display controller 1930 adds a virtual object to the image based on the estimated pose information of the target object and displays the image to which the virtual object is added. A display method of displaying a virtual object described above with reference to FIGS. 15 through 18 may be applied to the display controller 1930. The descriptions of FIGS. 15 through 18 are also applicable to FIG. 19, and are incorporated herein by reference. Thus, a more detailed and repeated description will be omitted here for brevity.

According to examples described herein, it is possible to obtain 6DoF pose information from a single image, use the pose information for rending a 3D virtual object to be matched to a real object in an AR, and assist SLAM using the pose information.

According to examples described herein, it is possible to replace a main task or an auxiliary task based on an actual demand for a task in a network, and continuously add an effective auxiliary task, such as, for example, dividing portions of an object.

According to examples described herein, it is possible to set a network module for each task and adjust a loss function weight of each module, and thus obtain an optimal effect of a pose information estimation task which is a main task. By adjusting a loss function weight of each module and making another task be a main task, it is possible to obtain an optimal effect.

The pose estimation apparatus 1300, receiver 1310, estimator 1320, pose estimation apparatus 1400, display apparatus 1900, detector 1910, estimator 1920, display controller 1930, and other apparatuses, units, modules, devices, and other components described herein with respect to FIGS. 13, 14, and 19 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12, and 15-18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card, or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pose estimation method comprising:
   receiving an input image;
   estimating pose information of an object from the input image, using a neural network, based on local information of the object; and
   concurrently estimating keypoint information of the object while estimating the pose information of the object,
   wherein the local information is based on the keypoint information, and
   wherein a task of the estimating of the pose information and a task of the estimating of the keypoint information share parameters of a base layer in the neural network.

2. The pose estimation method of claim 1, wherein the estimating of the pose information of the object comprises:
   correcting the pose information using the keypoint information.

3. The pose estimation method of claim 1, wherein the task of the estimating of the pose information and the task of the estimating of the keypoint information are connected in the neural network through one of a parallel mode and a cascade mode,
   wherein the keypoint information is input to the task of estimating the pose information in the cascade mode.

4. The pose estimation method of claim 1, wherein the neural network comprises:
   a first path comprising the base layer and one or more convolution layers to estimate the keypoint information; and
   a second path comprising the base layer and one or more fully-connected layers to estimate the pose information.

5. The pose estimation method of claim 1, wherein the neural network comprises:
   a first path comprising the base layer and one or more convolution layers to estimate the keypoint information; and
   a second path comprising the base layer, one or more convolution layers, and one or more fully-connected layers to estimate the pose information,
   wherein an output of one of the convolution layers in the first path is connected to an output of one of the convolution layers in the second path to be input to the fully-connected layers.

6. The pose estimation method of claim 1, wherein the neural network comprises:
   a first path comprising the base layer and one or more convolution layers to estimate the keypoint information; and
   a second path comprising the base layer, the one or more convolution layers in the first path, and one or more fully-connected layers to estimate the pose information,
   wherein outputs of two or more of the convolution layers in the first path are connected and input to one of the fully-connected layers in the second path.

7. The pose estimation method of claim 1, further comprising:
   concurrently estimating class information of the object from the input image while estimating the pose information and the keypoint information of the object.

8. The pose estimation method of claim 7, wherein the task of estimating the pose information, the task of estimating the keypoint information, and a task of estimating the class information share the parameters of the base layer in the neural network.

9. The pose estimation method of claim 8, wherein the neural network further comprises:
   a third path comprising the base layer and one or more connected layers to estimate the class information.

10. An apparatus comprising:
    a processor configured to:
    receive an input image;
    estimate pose information of an object from the input image, through a neural network, based on local information of the object; and
    concurrently estimating keypoint information of the object, through the neural network, while estimating the pose information of the object,
    wherein the local information is based on the keypoint information, and
    wherein a task of the estimating of the pose information and a task of the estimating of the keypoint information share parameters of a base layer in the neural network.

11. The apparatus of claim 10, wherein the processor is further configured to:
    correct the pose information using the keypoint information.

12. The apparatus of claim 10, wherein the neural network comprises:
    a first path comprising the base layer and one or more convolution layers to estimate the keypoint information; and
    a second path comprising the base layer and one or more fully-connected layers to estimate the pose information.

13. The apparatus of claim 10, wherein the neural network comprises:

a first path comprising the base layer and one or more convolution layers to estimate the keypoint information; and a second path comprising the base layer, one or more convolution layers, and one or more fully-connected layers to estimate the pose information, wherein an output of one of the convolution layers in the first path is connected to an output of one of the convolution layers in the second path to be input to the fully-connected layers.

14. The apparatus of claim 10, wherein the neural network comprises:

a first path comprising the base layer and one or more convolution layers to estimate the keypoint information; and a second path comprising the base layer, the one or more convolution layers in the first path, and one or more fully-connected layers to estimate the pose information, wherein outputs of two or more of the convolution layers in the first path are connected and input to one of the fully-connected layers in the second path.

\* \* \* \* \*